United States Patent [19]
Fukuda et al.

[11] Patent Number: 6,144,533
[45] Date of Patent: Nov. 7, 2000

[54] THIN FILM MAGNETIC HEAD

[75] Inventors: Kazumasa Fukuda, Komoro; Noboru Yamanaka, Saku; Yuzuru Iwai, Komoro, all of Japan

[73] Assignee: TDK Corporation, Tokyo, Japan

[21] Appl. No.: 09/215,301

[22] Filed: Dec. 18, 1998

[30] Foreign Application Priority Data

Jan. 12, 1998 [JP] Japan .................................. 10-003763

[51] Int. Cl.$^7$ .................................................. G11B 5/127
[52] U.S. Cl. .......................................................... 360/313
[58] Field of Search .................................. 360/113, 125, 360/126, 313

[56] References Cited

U.S. PATENT DOCUMENTS

| | | | |
|---|---|---|---|
| 5,438,747 | 8/1995 | Krounbi et al. | 360/113 |
| 5,452,164 | 9/1995 | Cole et al. | 360/113 |

FOREIGN PATENT DOCUMENTS

| | | |
|---|---|---|
| 7-225917 | 8/1995 | Japan . |
| 7-262519 | 10/1995 | Japan . |

OTHER PUBLICATIONS

Y. Tang, et al. "A Technique for Measuring Nonlinear Bit Shift", IEEE Transactions on Magnetics, vol. 27 No. 6, Nov. 1991, pp. 5316–5318.

Pradeep Thayamballi, "Modeling the Effects of Write Field Rise Time on the Recording Properties in Thin Film Media", IEEE Transactions on Magnetics, vol. 32 No. 1, Jan. 1996, pp.61–66.

*Primary Examiner*—Allen T. Cao
*Attorney, Agent, or Firm*—Oblon, Spivak, McClelland, Maier & Neustadt, P.C.

[57] ABSTRACT

The present invention relates to a thin film magnetic head that achieves low NLTS and demonstrates outstanding O/W characteristics in a high frequency range. A first magnetic film and a second magnetic film face opposite each other over a gap film at a side where a surface facing opposite the medium is present. A first yoke and a second yoke, which extend rearward on the opposite side from the surface facing opposite the medium, are linked to each other at a rear linking portion. A coil film, which is supported by an insulating film, is provided in a coil around the rear linking portion. $N/YL \geq 0.2$ (turns/$\mu$m) is satisfied, with YL ($\mu$m) representing the distance from the surface facing opposite the medium to the rear linking portion and N (turns) representing the number of turns of the coil film.

4 Claims, 6 Drawing Sheets

THIN FILM MAGNETIC HEAD

BACKGROUND OF THE INVENTION

1. Field of the Invention

The present invention relates to a thin film magnetic head, and more specifically it relates to a thin film magnetic head with improved write characteristics in the high frequency range.

2. Discussion of Background

An inductive electromagnetic transducer is employed to constitute the write element in a thin film magnetic head which is used in a magnetic disk device constituting a storage apparatus of a computer in the prior art. The inductive thin film magnetic transducer constituting the write element is provided with a first magnetic film, a second magnetic film, a gap film, a coil film supported by an insulating film and the like.

The front ends of the first magnetic film and the second magnetic film are respectively constituted of a first pole tip and a second pole tip that face opposite each other over the gap film having a very small thickness, and a write is performed at the first and second pole tips. The yokes of the first magnetic film and the second magnetic film are linked to each other to complete a magnetic circuit at a back gap portion that is located on the opposite side from the first and second pole tips. The coil film is formed to wind around the back gap portion in a coil.

An MR (magnetoresistive) element is employed to constitute the read element. The MR read element is capable of achieving a high degree of resolution regardless of its speed relative to the magnetic disk. The MR read element includes a first shield film, a second shield film and an MR element. The first shield film and the second shield film are provided over a distance from each other via an appropriate non-magnetic insulator, with the MR element provided between the first shield film and the second shield film.

In order to support high recording density using this type of thin film magnetic head, the quantity of data stored in memory per unit area of the magnetic disk (areal density) must be increased. An improvement in the areal density viewed from the thin film magnetic head is achieved through an improvement in the capability of the write element and by achieving a higher frequency at the write circuit.

In one of the means for improving the capability of the write element to improve the areal density, the length of the gap between the pole tips is reduced. In another means for improving the areal density, the number of data tracks that can be recorded in the magnetic disk is increased. The number of tracks that can be recorded in a magnetic disk is normally expressed as TPI (tracks per inch). The TPI capability of a write element can be improved by reducing the head dimensions that determine the data track width.

Various methods have been tried in the prior art as specific means for improving the areal density through an improvement in the write element capability. For instance, Japanese Unexamined Patent Publication No. 262519/1995 and Japanese Unexamined Patent Publication No. 225917/1995 disclose means for adjusting the width of the lower portion to the width of the second pole tip through ion beam milling.

Now, in order to achieve an improvement in the areal density through higher frequency at the write circuit, the maximum recording/reproducing frequency at a thin film magnetic head has been increased to as high as 100 MHz or higher in recent years. However, it has been learned that in such a high frequency range, the non-linear transition shift (hereafter referred to as NLTS) increases and that the overwrite characteristics (hereafter referred to as the O/W characteristics) deteriorate. NLTS refers to a phenomenon in which the write position shifts when a write is performed with data bits in close proximity on the magnetic recording medium. NLTS is explained in IEEE, TRANSACTIONS ON MAGNETICS vol. 27, No. 6, November, 1991, pages 5316 to 5318 and in IEEE, TRANSACTIONS ON MAGNETICS vol. 32, No. 1, January 1996, pages 61 to 66. As explained in these publications, when the degree of NLTS increases, various read systems are critically affected, for instance, the operating characteristics of a PRML (partial response maximum likelihood) read system.

To date, NLTS has been corrected through circuit means in this type of thin film magnetic head. However, NLTS can be corrected through a circuit-type method only up to 40%. When the geometric design means described above is adopted for the poles, NI,TS cannot be reduced to 40% or lower, which is required in practical use, in a high frequency range of 100 MHz or higher.

SUMMARY OF THE INVENTION

It is an object of the present invention to provide a thin film magnetic head that achieves low NLTS and demonstrates outstanding O/W characteristics in a high frequency range.

In order to achieve the object described above, the thin film magnetic head according to the present invention is provided with a slider and, at least, one write element. The slider is provided with a surface facing opposite the medium.

The write element, which includes a first magnetic film, a second magnetic film, a gap film and a coil film, is mounted on the slider.

The first magnetic film and the second magnetic film, which face opposite each other across the gap film on the side where the surface facing opposite the medium is present, are linked to each other at a rear linking portion that is located on the opposite side from the surface facing opposite the medium. The coil film, which is supported by an insulating film, is provided around the rear linking portion in a coil.

When YL ($\mu$m) represents the distance from the surface facing opposite the medium to the rear linking portion and N (turns) represents the number of turns of the coil film; N/YL$\geq$0.2 (turns/$\mu$m) is satisfied.

With the thin film magnetic head structured as described above, NLTS is maintained at a low degree and outstanding O/W characteristics are assured even when a write current with a high frequency of 100 MHz or higher is supplied.

The thin film magnetic head according to the present invention normally includes an MR read element. The MR read element includes a first shield film, a second shield film and an MR element, with the first shield film and the second shield film provided over a distance from each other and the MR element provided between the first shield film and the second shield film.

The write element is laminated onto the MR read element. In this structure, the second shield film also functions as the first magnetic film of the write element, to achieve a smaller thickness.

BRIEF DESCRIPTION OF THE DRAWINGS

Other objects, structural features and advantages of the present invention are explained in further detail by referring to the attached drawings illustrating the embodiments, wherein.

DETAILED DESCRIPTION OF THE PREFERRED EMBODIMENTS

Figure 1:
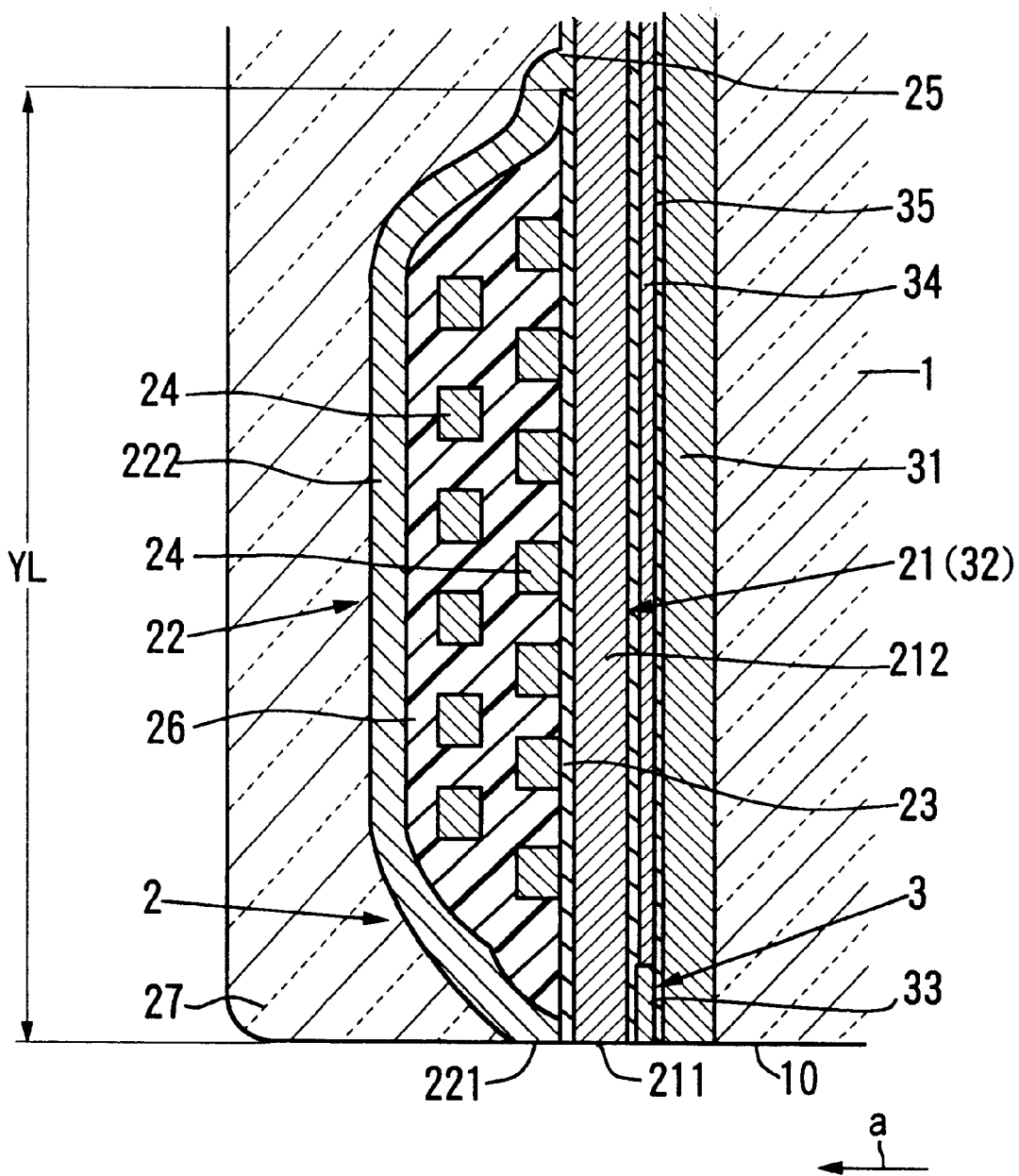
FIG. 1 is a sectional view of the thin film magnetic head according to the present invention.

In FIG. 1, the thin film magnetic head according to the present invention is illustrated with its dimensions exaggerated. In the figure, only the front half of the coil turns of the coil wound in a spiral is illustrated with the illustration of its rear half omitted. The thin film magnetic head in this embodiment is a combined type that is provided with both a write element 2 and an MR read element 3. The write element 2 and the MR read element 3 are both laminated on a slider base body 1, with the read/write portion located at a surface 10 facing opposite the medium (air bearing surface) of the slider base body 1. The arrow "a" indicates the direction in which the magnetic recording medium rotates (the direction of airflow).

The write element 2, which is constituted of an inductive thin film magnetic transducer, is laminated on the MR read element 3. The write element 2, which includes a first magnetic film 21, a second magnetic film 22, a gap film 23 and a coil film 24, is mounted at an air outflow end of the slider base body 1.

The first magnetic film 21 and the second magnetic film 22, which face opposite each other over the gap film 23 on the side where the surface 10 facing opposite the medium is present, are linked with each other at a rear linking portion 25 located on the opposite side from the surface 10 facing opposite the medium.

In the embodiment in the figure, the first magnetic film 21 is provided with a pole end 211 and a yoke 212. The pole end 211 is located on the plane of the surface 10 facing opposite the medium, and the yoke 212 extends rearward of the pole end 211 viewed from the surface 10 facing opposite the medium. The second magnetic film 22, too, is provided with a pole end 221 and a yoke 222. Normally, the first magnetic film 21 and the second magnetic film 22 are constituted of Permalloy. The pole end 211 of the first magnetic film 21 and the pole end 221 of the second magnetic film 22 face opposite each other over the gap film 23 at the surface 10 facing opposite the medium.

The gap film 23 may be constituted of a metal oxide such as $Al_2O_3$, $SiO_2$ or a nitride such as AlN, BN, SiN or the like. Alternatively, it may be constituted of a conductive non-magnetic material such as Au, Cu, NiP or the like.

The yoke 212 of the first magnetic film 21 and the yoke 222 of the second magnetic film 22 extend rearward of the pole ends 211 and 221 respectively viewed from the surface 10 facing opposite the medium and are linked with each other at the rear linking portion 25. This completes a thin film magnetic circuit constituted of the first magnetic film 21 and the second magnetic film 22. The coil film 24, which is supported by an insulating film 26, is provided winding around the rear linking portion 25 in a spiral.

The present invention is characterized in that when YL ($\mu$m) represents the distance from the pole end 211 or 221 at the surface 10 facing opposite the medium to the rear linking portion 25 and N (turns) represents the number of turns of the coil film 24, N/YL$\geq$0.2 (turns/$\mu$m) is satisfied.

The expression N/YL$\geq$0.2 (turns/$\mu$m) indicates that when the length of the yokes 212 and 222 extending from the pole end 211 and the pole end 221 respectively to the rear linking portion 25 is taken into consideration, the number of coil turns per their unit length must be large, i.e., the coil film 24 must be wound compactly relative to the length of the yokes 212 and 222. This assures low NLTS and outstanding O/W characteristics even when a write current at a high frequency of 100 MHz or higher is supplied to the write element 2. This point is explained in more specific terms by referring to data obtained through actual measurement.

Figure 2:
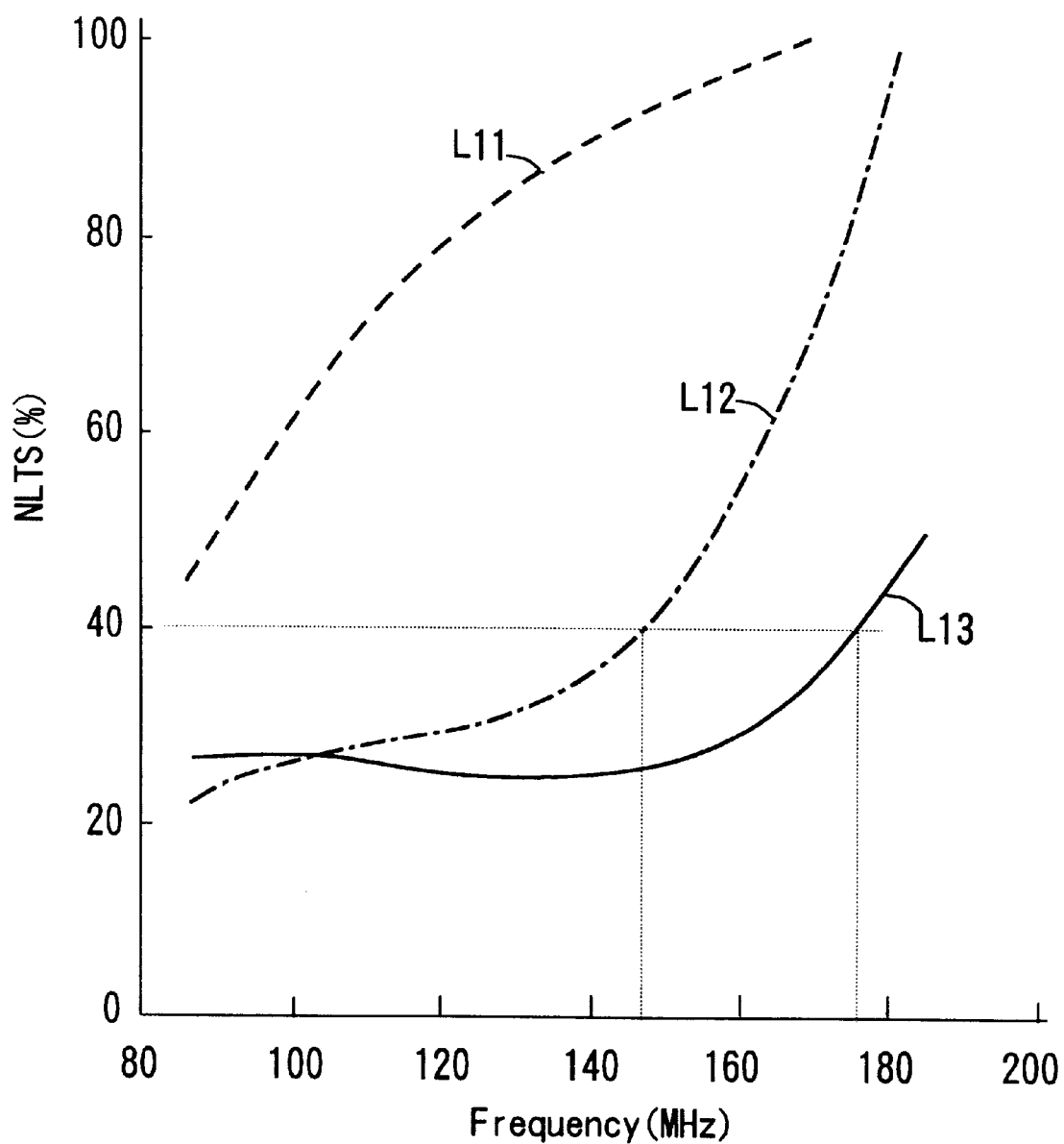
FIG. 2 is a characteristics diagram illustrating the change in NLTS (%) occurring when the write current frequency is varied.

FIG. 2 is a characteristics diagram illustrating the change in NLTS (%) occurring when the write current frequency is varied. The curve L11 represents characteristics achieved when N/YL$\leq$0.15 (turns/$\mu$m), the curve L12 represents characteristics achieved when 0.2 (turns/$\mu$m) >N/YL >0.15 (turns/$\mu$m) and the curve L13 represents characteristics achieved when N/YL $\geq$0.2 (turns/$\mu$m). These characteristics are achieved with the linear density at 200 kFCI (flux change per inch) and the coil magnetomotive force at 400 mAT. The coil magnetomotive force of 400 mAT is achieved by supplying a 36.4 mA coil current with the number of turns set at 11 for the coil film 24.

As the characteristics curve L11 indicates, NLTS increases drastically in the range over which the frequency exceeds 100 MHz when N/Y$\leq$0.15 (turns/$\mu$m).

In the range of 0.2 (turns/$\mu$m)>N/YL>0.15 (turns/$\mu$m), while NLTS is improved compared to that over the range of N/Y$\leq$0.15 (turns/$\mu$m), it increases drastically when the frequency exceeds 140 MHz, to exceed 40(%) as indicated by the curve L12.

In contrast, within the range of N/YL$\geq$0.2 (turns/$\mu$m) as disclosed in the present invention, NLTS is kept down to approximately 25 to 40% even when the frequency exceeds 100 MHz until it reaches 160 MHz.

Figure 3:
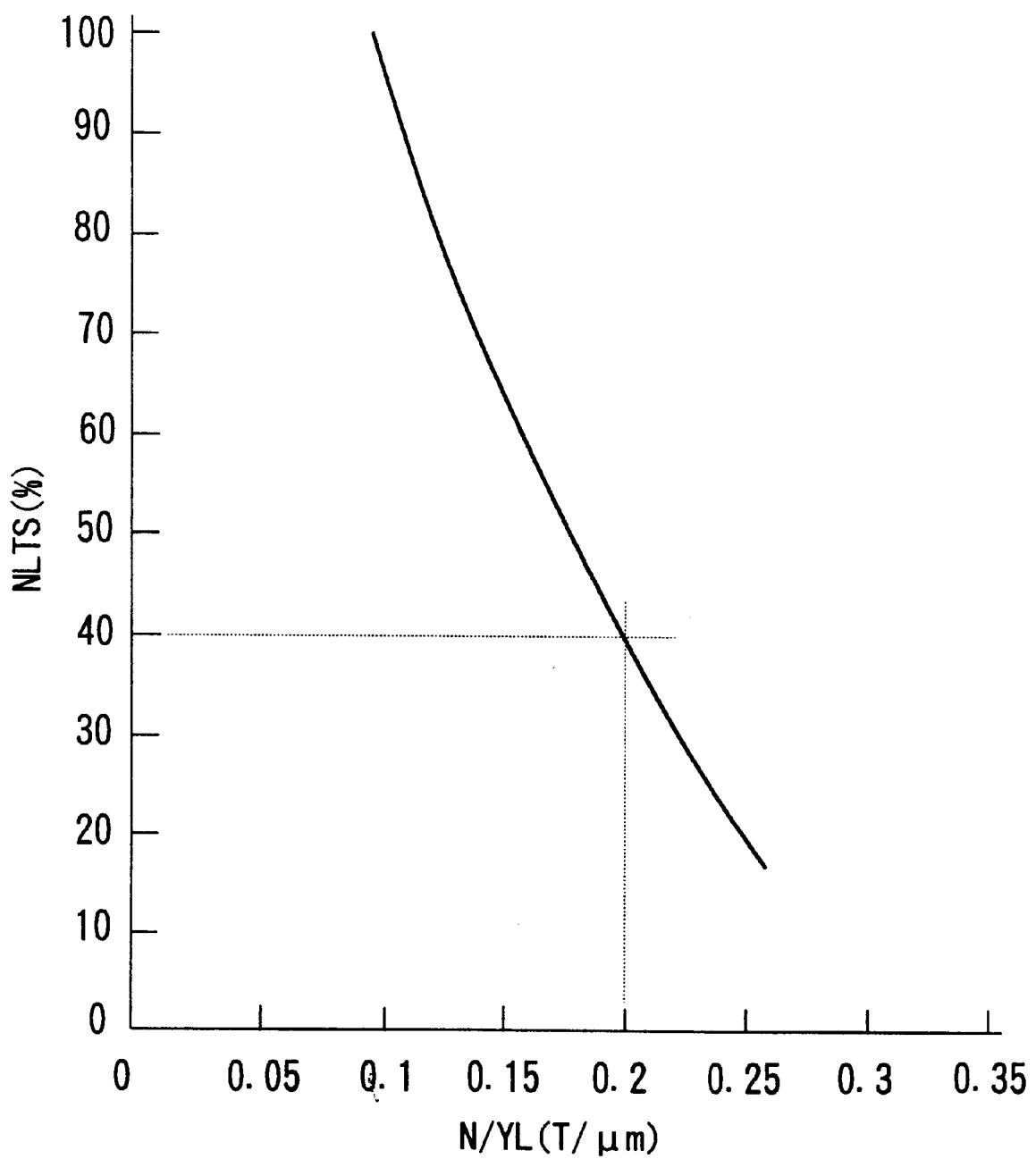
FIG. 3 presents data that illustrate change in NLTS occurring when the N/YL is varied.

FIG. 3 presents data that illustrate change in NLTS when N/YL is varied. As FIG. 3 indicates, NLTS of 40(%) or lower is achieved when N/YL is 0.2 (turns/$\mu$m) or higher.

In this type of thin film magnetic head, NLTS has been corrected through a circuit means. However, NLTS can be corrected only to 40% through such circuit means, and correction of NLTS beyond 40% cannot be achieved. In the thin film magnetic head according to the present invention, by selecting the range for N/YL to satisfy N/YL$\geq$0.2 (turns/$\mu$m), NLTS can be kept at or below 40% up to a frequency of approximately 180 MHz.

Figure 4:
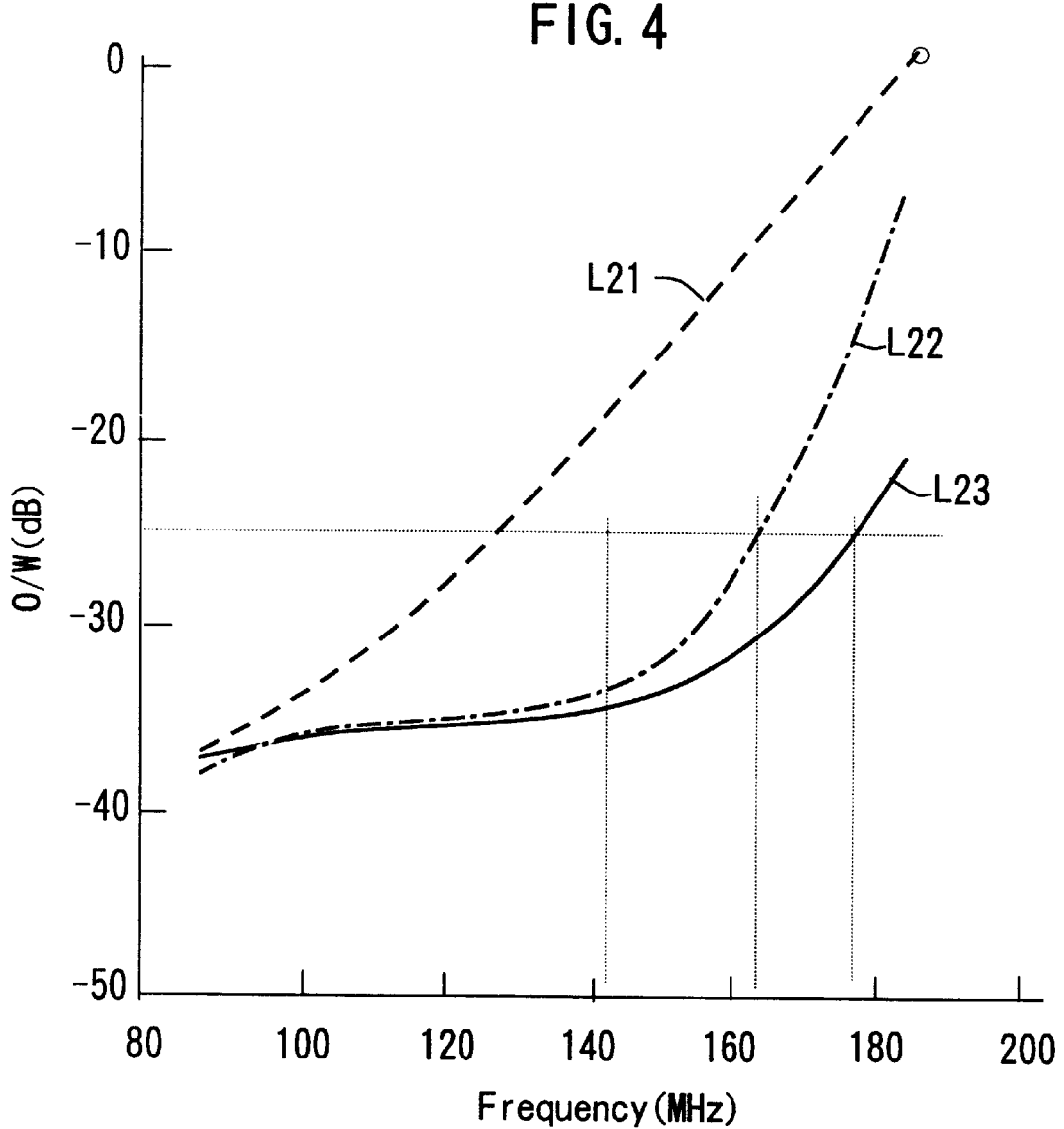
FIG. 4 is a characteristics diagram illustrating change in the O/W (dB) occurring when the write current frequency is varied.

FIG. 4 is a characteristics diagram illustrating change in O/W (dB) occurring when the write current frequency is varied. The curve L21 represents characteristics achieved when N/YL$\leq$0.15 (turns/$\mu$m), the curve L22 represents characteristics achieved when 0.2 (turns/$\mu$m) >N/YL>0.15 (turns/$\mu$m) and the curve L23 represents characteristics achieved when N/YL$\geq$0.2 (turns/$\mu$m). These characteristics are achieved with the linear density at 200 kFCI (flux change per inch) and the coil magnetomotive force at 400 mAT. The coil magnetomotive force 400 mAT is achieved by supplying a 36.4 mA coil current with the number of turns set at 11 for the coil film 24.

As the characteristics curve L21 indicates, the O/W characteristics deteriorate sharply in the range over which the frequency exceeds 100 MHz, when N/YL≦0.15 (turns/ $\mu$m).

In the range of 0.2 (turns/$\mu$m)>N/YL>0.15 (turns/$\mu$m), while the O/W characteristics are improved compared to those demonstrated when N/YL≦0.15 (turns/$\mu$m), they deteriorate drastically when the frequency is higher than 140 MHz and register −25 (dB) or higher in the vicinity of 160 MHz as indicated by the curve L22.

In contrast, within the range of N/YL≧0.2 (turns/$\mu$m) disclosed in the present invention, the O/W characteristics are maintained at or below −25 (dB) even when the frequency exceeds 100 MHz until it reaches approximately 180 MHz.

Figure 5:
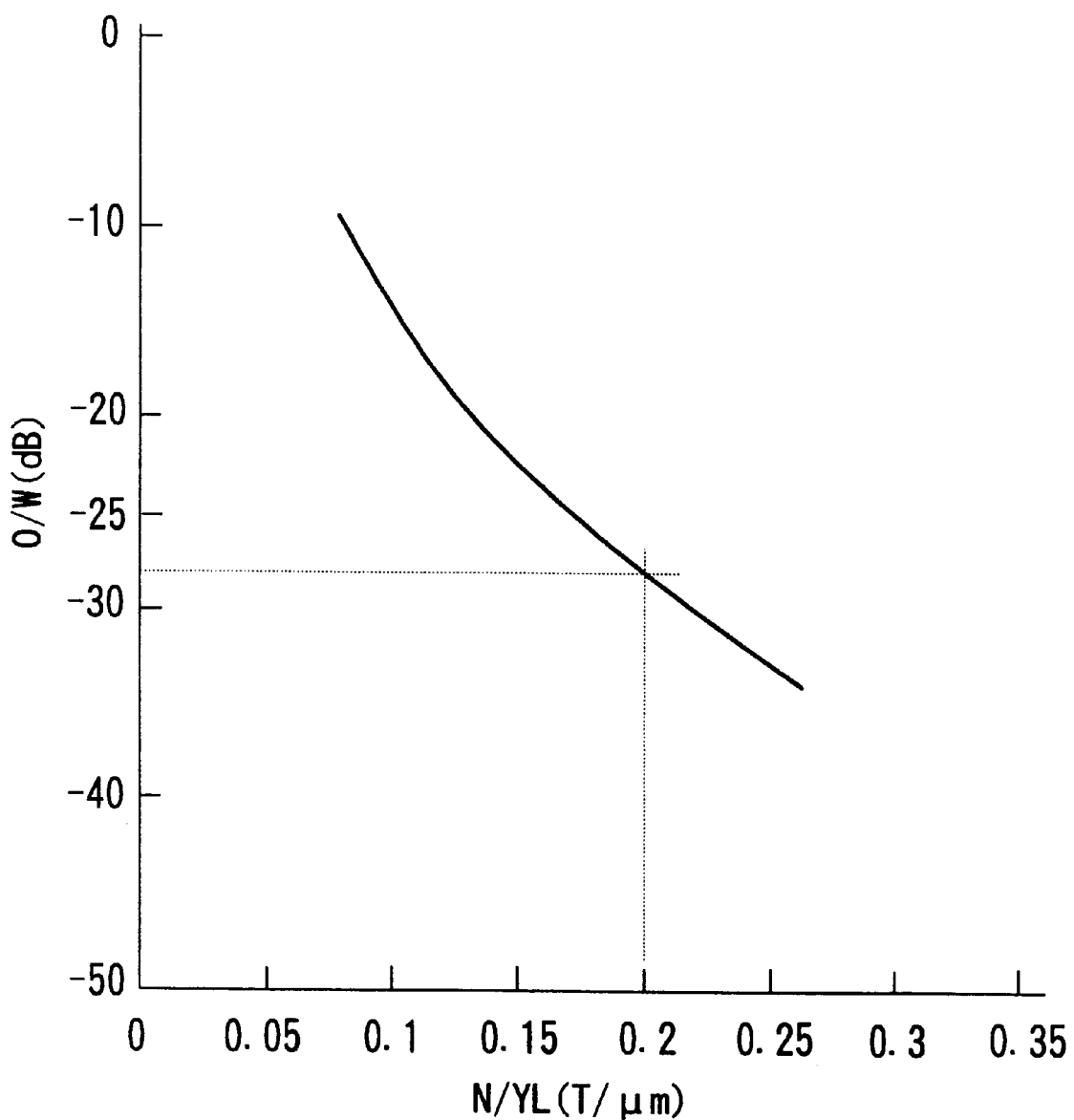
FIG. 5 presents data that illustrate change in the O/W (dB) occurring when the N/YL is varied.

FIG. 5 presents data that illustrate change in O/W (dB) occurring when N/YL is varied. As FIG. 5 illustrates, an O/W of −25 (dB) or lower is achieved when N/YL is 0.2 (turns/$\mu$m) or more.

In this type of thin film magnetic head, the allowable limit of O/W is −25 (dB) or below. As explained above, this requirement is satisfied in the thin film magnetic head according to the present invention until the frequency reaches approximately 180 MHz.

The MR (magnetoresistive) read element 3 includes a first film 31, a second shield film 32, an MR element 33 and a lead conductor film 34. The first shield film 31 and the second shield film 32 are provided over a distance from each other with the MR element 33 provided between the first shield film 31 and the second shield film 32. The second shield film 32 also constitutes the first magnetic film 21 of the write element 2. A non-magnetic insulating film 35 is provided between the first shield film 31 and the second shield film 32, with the MR element 33 and the lead conductor film 34 provided inside the non-magnetic insulating film 35.

The write element 2 is laminated onto the MR read element 3. In this structure, the second shield film 32 also functions as the first magnetic film 21 of the write element 2.

According to the present invention, the write element 2 may be constituted of an inductive thin film magnetic transducer selected from various types that have been proposed to date or that will be proposed in the future. Likewise, the MR read element 3 may be constituted of any of various types of elements that have been proposed to date or that will be proposed in the future including an element that utilizes a magnetic anisotropic magnetoresistive film such as a Permalloy film and an element that utilizes the giant magnetoresistance effect, typical examples of which include a spin valve film and a tunnel junction effect film. The write element 2 and the MR read element 3 are mounted on the slider. The slider may be of the type provided with one or more rails, or it may be provided with no rails.

Figure 6:
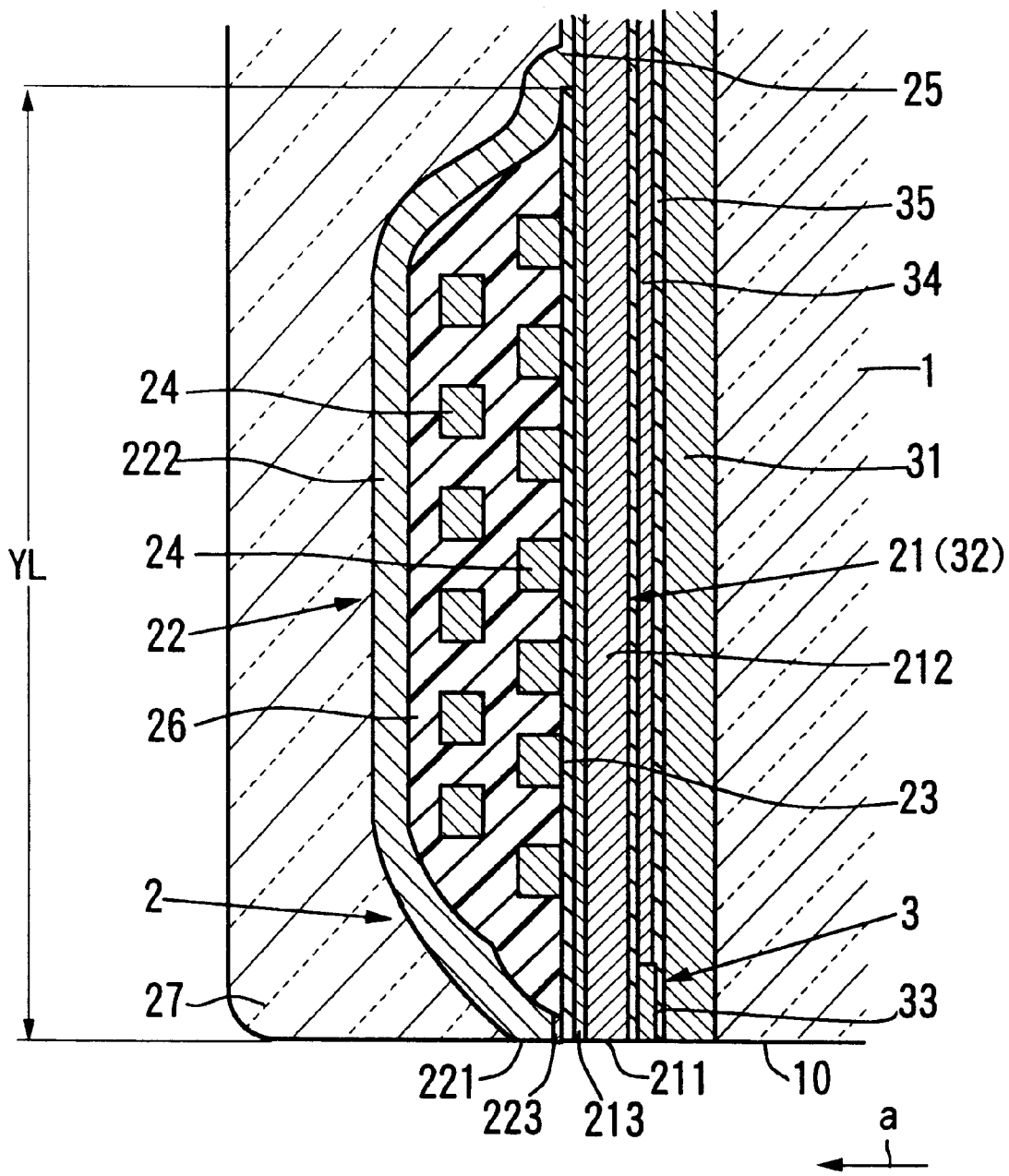
FIG. 6 is a sectional view illustrating another embodiment of the thin film magnetic head according to the present invention.

FIG. 6 is a sectional view of another embodiment of the thin film magnetic head according to the present invention. In the figure, the same reference numbers are assigned to components identical to those in FIG. 1. This embodiment is characterized in that a third magnetic film 213 is provided at the surface of the first magnetic film 21 that faces opposite the gap and a fourth magnetic film 223 is provided at the surface of the second magnetic film 22 that faces opposite the gap.

The third magnetic film 213 and the fourth magnetic film 223 may be constituted of a material having a higher saturation magnetic flux density compared to that of Permalloy, to assure sufficient recording performance even on a magnetic recording medium with a high degree of coercivity. In that case, a material having a higher degree of saturation magnetic flux density compared to that of Permalloy should be selected. For instance, a material constituted of at least one substance selected from: Fe—Co, Fe—M and Fe—Co—M may be used. In this context, M represents at least one substance selected from: Ni, N, C, B, Si, Al, Ti, Zr, Hf, Mo, Ta and Nb (all chemical symbols). The third magnetic film 213 and the fourth magnetic film 223 both may be constituted of the high saturation magnetic flux density material described above or only either one of them may be constituted of the high saturation magnetic flux density material described above.

In addition, at least either the first magnetic film 21 or the second magnetic film 22 may be constituted of a maternal having a higher resistivity compared to that of Permalloy. In this case, the eddy current loss occurring when a higher frequency is achieved in the write circuit can be reduced compared to that in the structure employing Permalloy. Specific examples of such a high resistivity material include a material constituted of at least one substance selected from: amorphous Fe—Co, Fe—M—N, Fe—M—O, Fe—Co—M—N, Fe—Co—M—O and Fe—Co—N. In this context, M represents at least one substance selected from Ni, B, Si, Al, Ti, Zr, Hf, Mo, Ta and Nb (all chemical symbols). Both the first magnetic film 21 and the second magnetic film 22 may be constituted of the high resistivity material described above, or only either one of them may be constituted of the high resistivity material described above.

While the invention has been particularly shown and described with respect to preferred embodiments thereof by referring to the attached drawings, the present invention is not limited to these examples and it will be understood by those skilled in the art that various changes in form and detail may be made therein without departing from the spirit, scope and teaching of the invention.

What is claimed is:

1. A thin film magnetic head that has a slider base body with a surface facing opposite a medium, and at least one write element comprising:
    a gap film;
    a first magnetic film and a second magnetic film that face opposite each other over said gap film at a side where said surface facing opposite the medium is present and are linked with each other at a rear linking portion located on a side opposite from said surface facing opposite said medium; and
    a coil film that is mounted at said slider base body, supported by an insulating film and provided in a coil around said rear linking portion, wherein:
        when YL represents the distance from said surface facing opposite the medium to said rear linking portion and N represents the number of turns of said coil film, N/YL≧0.2 (turns/$\mu$m) is satisfied.

2. The thin film magnetic head of claim 1, further having an MR read element comprising a first shield film, a second shield film and an MR element;
    said MR element being provided between said first shield film and said second shield film and said second shield film constituting said first magnetic film of said write element.

3. The thin film magnetic head of claim 1, employed in a recording frequency range of 100 MHz or higher.

4. The thin film magnetic head of claim 1, wherein
    Non-linear Transition Shift is within a range of approximately 25 to 40% within a recording frequency range of 100 MHz to 160 MHz.

* * * * *